US012759462B2

(12) United States Patent
Yamasaki et al.

(10) Patent No.: US 12,759,462 B2
(45) Date of Patent: Oct. 13, 2026

(54) VEHICLE WITH ROAD SURFACE RENDERING FUNCTION

(71) Applicant: SUBARU CORPORATION, Tokyo (JP)

(72) Inventors: Kentarou Yamasaki, Tokyo (JP); Makoto Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 27 days.

(21) Appl. No.: 18/430,503

(22) Filed: Feb. 1, 2024

(65) Prior Publication Data

US 2024/0270169 A1 Aug. 15, 2024

(30) Foreign Application Priority Data

Feb. 14, 2023 (JP) ................................ 2023-021178

(51) Int. Cl.

| | |
|---|---|
| ***B60R 1/24*** | (2022.01) |
| ***B60Q 1/50*** | (2006.01) |
| ***G06T 7/521*** | (2017.01) |
| ***H04N 23/56*** | (2023.01) |

(52) U.S. Cl.

CPC .................. *B60R 1/24* (2022.01); *B60Q 1/50* (2013.01); *G06T 7/521* (2017.01); *H04N 23/56* (2023.01); *B60R 2300/30* (2013.01); *G06T 2207/30252* (2013.01)

(58) Field of Classification Search

CPC ......... B60R 1/24; B60R 2300/30; B60Q 1/50; B60Q 1/0023; B60Q 1/085; B60Q 2400/50; G06T 7/521; G06T 2207/30252; H04N 23/56; E01F 9/608; E01F 9/615

See application file for complete search history.

(56) References Cited

U.S. PATENT DOCUMENTS 10,134,283 B2 11/2018 Masuda et al.
10,654,401 B2 * 5/2020 Hamada ................ B60Q 1/085
(Continued)

FOREIGN PATENT DOCUMENTS

CN 107364389 A * 11/2017 ............ G01S 17/88
JP 2015-164828 A 9/2015
(Continued)

*Primary Examiner* — Richard A Hansell, Jr.
(74) *Attorney, Agent, or Firm* — Rimon P.C.

(57) ABSTRACT

A vehicle with a road surface rendering function includes a projection member, a controller, and a detection device. The projection member is configured to perform light projection for road surface rendering at least toward a road surface ahead of the vehicle. The controller is configured to control the light projection. The detection device is configured to perform detection of the road surface where the projection member projects the light for the road surface rendering. The controller is configured to determine, based on the detection, whether a first road surface area in the road surface for the road surface rendering rises relative to a second road surface area where the vehicle is traveling. The controller is configured to suppress the light projection for the road surface rendering by the projection member based on determining that the first road surface area rises relative to the second road surface area.

5 Claims, 6 Drawing Sheets

(56) References Cited

U.S. PATENT DOCUMENTS

| | | | | |
|---|---|---|---|---|
| 2013/0243247 | A1* | 9/2013 | Sakaue | G01B 11/25<br>382/103 |
| 2015/0232017 | A1* | 8/2015 | Ooishi | B60Q 1/085<br>701/48 |
| 2016/0266242 | A1* | 9/2016 | Gilliland | G01S 17/931 |
| 2020/0262333 | A1* | 8/2020 | Lacaze | B60Q 1/085 |
| 2020/0269746 | A1* | 8/2020 | Raichelgauz | B60Q 1/085 |
| 2021/0009027 | A1* | 1/2021 | Mulligan | B60Q 1/14 |
| 2023/0161406 | A1* | 5/2023 | Kobayashi | G06F 3/012<br>345/156 |

FOREIGN PATENT DOCUMENTS

| | | | |
|---|---|---|---|
| JP | 2016-055691 | A | 4/2016 |
| JP | 2016-215877 | A | 12/2016 |
| JP | 2020-111284 | A | 7/2020 |

* cited by examiner

VEHICLE WITH ROAD SURFACE RENDERING FUNCTION

CROSS-REFERENCE TO RELATED APPLICATIONS

The present application claims priority from Japanese Patent Application No. 2023-021178 filed on Feb. 14, 2023, the entire contents of which are hereby incorporated by reference.

BACKGROUND

The disclosure relates to a vehicle with a road surface rendering function.

Japanese Unexamined Patent Application Publication (JP-A) Nos. 2016-055691, 2020-111284, 2015-164828, and 2016-215877 disclose that various patterns are rendered on a road surface where a vehicle is traveling by projecting light from the vehicle.

By rendering those patterns on the road surface, the vehicle can provide, for example, a driver who drives the vehicle with information on traveling of the vehicle via the road surface.

SUMMARY

An aspect of the disclosure provides a vehicle with a road surface rendering function. The vehicle includes a projection member, a controller, and a detection device. The projection member is configured to perform light projection for road surface rendering at least toward a road surface ahead of the vehicle. The controller is configured to control the light projection for the road surface rendering by the projection member. The detection device is configured to perform detection of the road surface where the projection member projects the light for the road surface rendering. The controller is configured to determine, based on the detection of the road surface by the detection device, whether a first road surface area in the road surface for the road surface rendering rises relative to a second road surface area where the vehicle is traveling. The controller is configured to suppress the light projection for the road surface rendering by the projection member based on determining that the first road surface area rises relative to the second road surface area.

An aspect of the disclosure provides a vehicle with a road surface rendering function. The vehicle includes a projection member, a detection device, and circuitry. The projection member includes a light source and is configured to perform light projection for road surface rendering at least toward a road surface ahead of the vehicle. The detection device includes a camera and is configured to perform detection of the road surface where the projection member projects the light for the road surface rendering. The circuitry is configured to control the light projection for the road surface rendering by the projection member. The circuitry is configured to determine, based on the detection of the road surface by the detection device, whether a first road surface area in the road surface for the road surface rendering rises relative to a second road surface area where the vehicle is traveling. The circuitry is configured to suppress the light projection for the road surface rendering by the projection member based on determining that the first road surface area for the road surface rendering rises relative to the second road surface area.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

It is not always appropriate to simply render a road surface rendered image on a road surface by projecting light from a vehicle.

Road surfaces have various reflection characteristics. The traveling vehicle may approach, for example, an uphill. When light for road surface rendering is projected to a rising part of the road surface relative to the vehicle, light that is more intense than expected may be reflected toward a driver of the vehicle It is desirable to improve the road surface rendering from the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
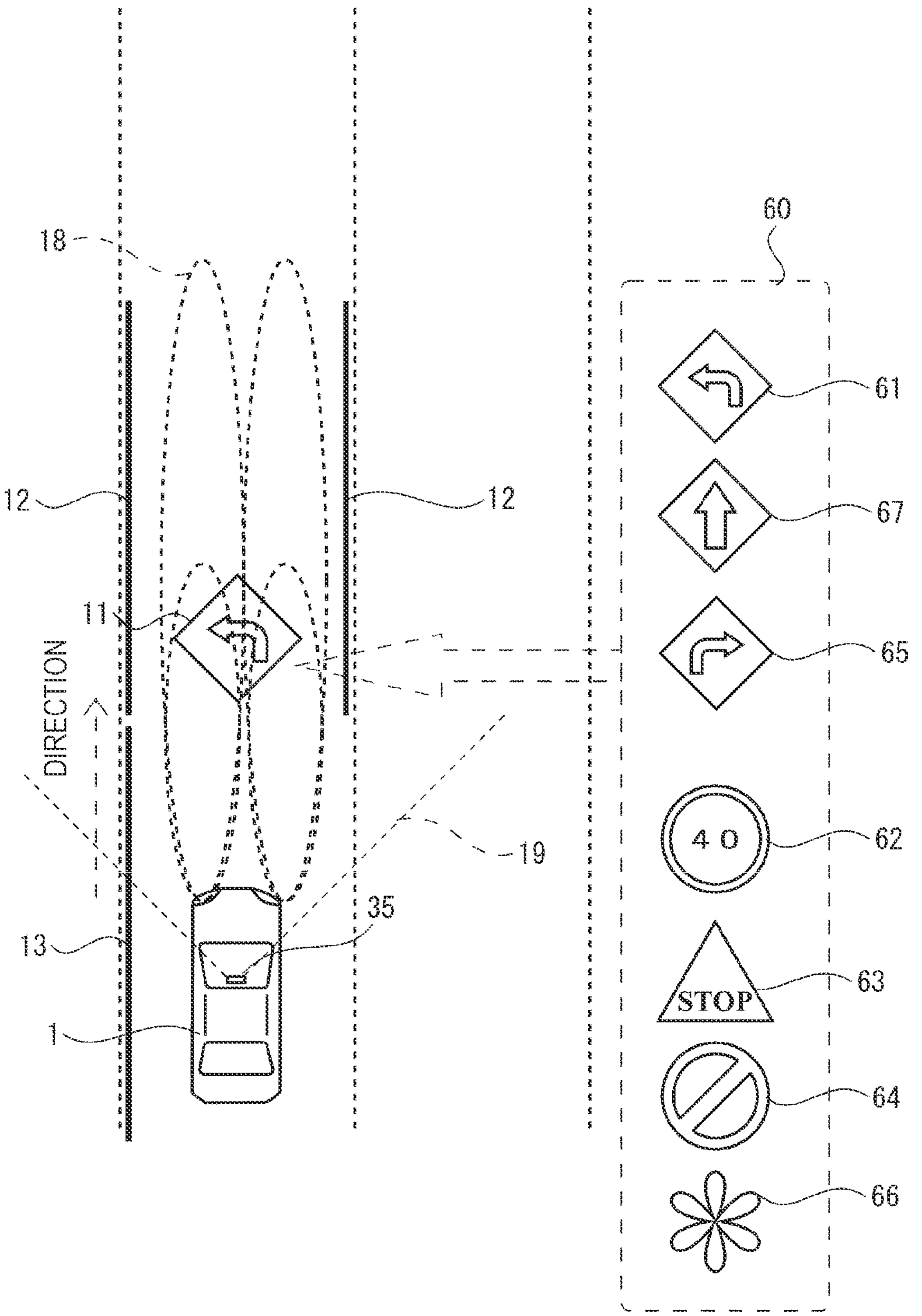
FIG. 1 illustrates an example of a traveling condition of a vehicle according to an embodiment of the disclosure.

FIG. 1 illustrates an example of a traveling condition of a vehicle 1 such as an automobile according to the embodiment of the disclosure.

FIG. 1 illustrates the vehicle 1 traveling along a road having one lane on one side. The automobile is an example of the vehicle 1. Other examples of the vehicle 1 include a bus, a truck, a motorcycle, and personal mobility. The vehicle 1 may travel by autonomous driving including drive assist.

In such a traveling environment, a driver of the vehicle 1 drives the vehicle 1 so as to prevent lane departure on the road while paying attention to, for example, a forward side in a traveling direction of the vehicle 1. In a dark traveling environment, the vehicle 1 may turn ON headlamps. In FIG. 1, the broken lines indicate radiation ranges 18 of the headlamps.

Research and development have been promoted on drawing a picture by radiating visible light onto a road surface from the vehicle 1.

For example, FIG. 1 illustrates a road surface rendered image 11 showing a simple picture of a traffic sign, lane making lines 12 extending along right and left sides of a currently traveling lane, and a road shoulder marking line 13 drawn on the side of the vehicle near a road shoulder. The road surface rendered image 11 is rendered ahead of the vehicle in its traveling direction for the driver of the vehicle. The lane making lines 12 and the road shoulder marking line 13 are drawn for a pedestrian on the road shoulder or for an oncoming vehicle 2.

On the right side of FIG. 1, projection patterns 60 serving as the road surface rendered image 11 are illustrated. FIG. 1 exemplifies a left turn projection pattern 61, a straightforward projection pattern 67, a right turn projection pattern 65, a speed limit projection pattern 62, a stop position projection pattern 63, a no-crossing projection pattern 64, and a projection pattern 66 using a pictogram for attention to snow or freezing. The vehicle 1 selects any one of the projection patterns 60 depending on its traveling condition or the traveling environment, and projects light corresponding to the selected projection pattern.

By rendering the pattern of the road surface rendered image 11 or the like on the road surface, the vehicle 1 can provide, for example, its driver with information on traveling of the vehicle 1 via the road surface.

It is not always appropriate to simply rendered the road surface rendered image 11 on the road surface by projecting light from the vehicle 1.

Road surfaces have various reflection characteristics. The traveling vehicle 1 may approach, for example, an uphill. When light for road surface rendering is projected to a rising part of the road surface relative to the vehicle, light that is more intense than expected may be reflected toward the driver of the vehicle.

Figure 2:
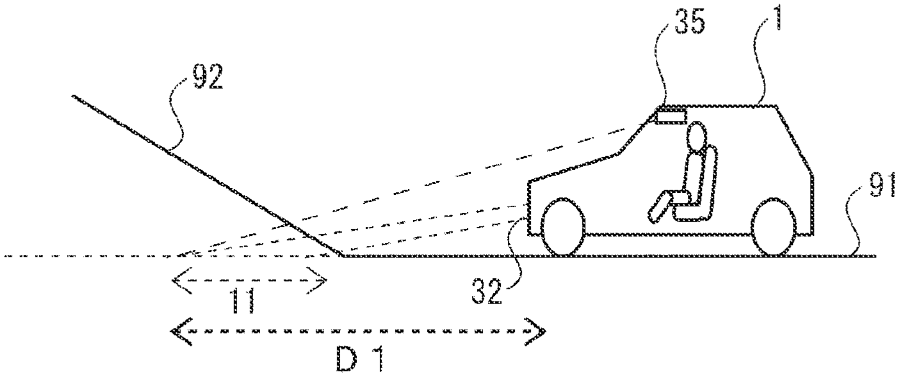
FIG. 2 illustrates a traveling condition in which a vehicle traveling along a flat road surface approaches an uphill.

FIG. 2 illustrates a traveling condition in which the vehicle 1 traveling along a flat road surface approaches an uphill.

The vehicle 1 renders the road surface rendered image 11 by projecting light onto the road surface while traveling along a flat road surface area 91. The vehicle 1 renders the road surface rendered image 11 basically at a predetermined separation distance D1 from the vehicle 1.

In FIG. 2, the road surface rendered image 11 is rendered on a road surface area 92 rising relative to the flat road surface area 91.

In this case, the distance from the vehicle 1 to the road surface area 92 where the road surface rendered image 11 is rendered decreases. Since the road surface area 92 rises relative to the flat road surface area 91, the light for the road surface rendered image 11 gathers into a small spot. For those reasons, the reflection light intensity of the road surface rendered image 11 in FIG. 2 is expected to become higher than in a case where the road surface rendered image 11 is rendered on an extension surface of the flat road surface area 91 indicated by the broken line in the figure. The driver of the vehicle 1 may be irradiated with intense light of the road surface rendered image 11.

Figure 3:
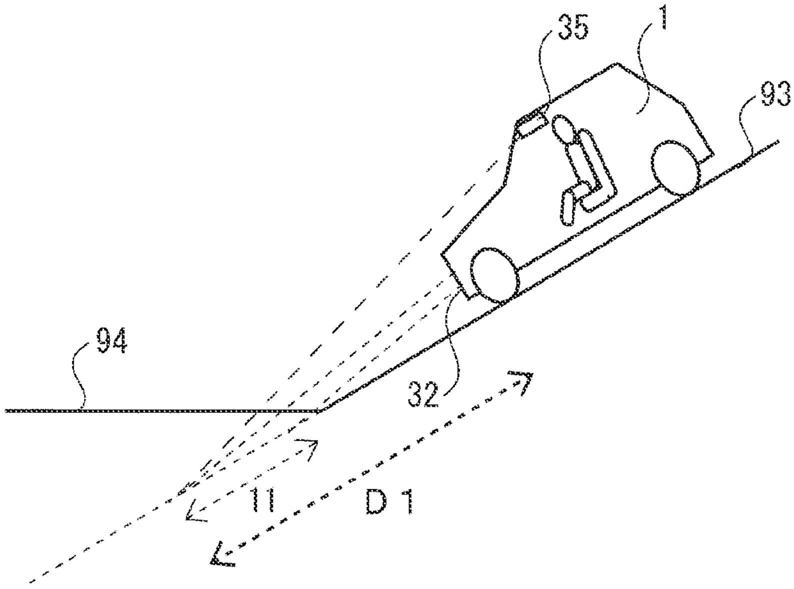
FIG. 3 illustrates a traveling condition in which the vehicle traveling along a downhill approaches a flat road surface.

FIG. 3 illustrates a traveling condition in which the vehicle 1 traveling along a downhill approaches a flat road surface.

The vehicle 1 renders the road surface rendered image 11 by projecting light onto the road surface while traveling along a downhill road surface area 93. The vehicle 1 renders the road surface rendered image 11 basically at the predetermined separation distance D1 from the vehicle 1.

In FIG. 3, the road surface rendered image 11 is rendered on a flat road surface area 94 rising relative to the downhill road surface area 93.

In this case, the distance from the vehicle 1 to the road surface area 94 where the road surface rendered image 11 is rendered decreases. Since the road surface area 94 rises relative to the downhill road surface area 93, the light for the road surface rendered image 11 gathers into a small spot. For those reasons, the reflection light intensity of the road surface rendered image 11 in FIG. 3 is expected to become higher than in a case where the road surface rendered image 11 is rendered on an extension surface of the downhill road surface area 93 indicated by the broken line in the figure. The driver of the vehicle 1 may be irradiated with intense light of the road surface rendered image 11.

It is desirable to improve the road surface rendering from the vehicle.

Figure 4:
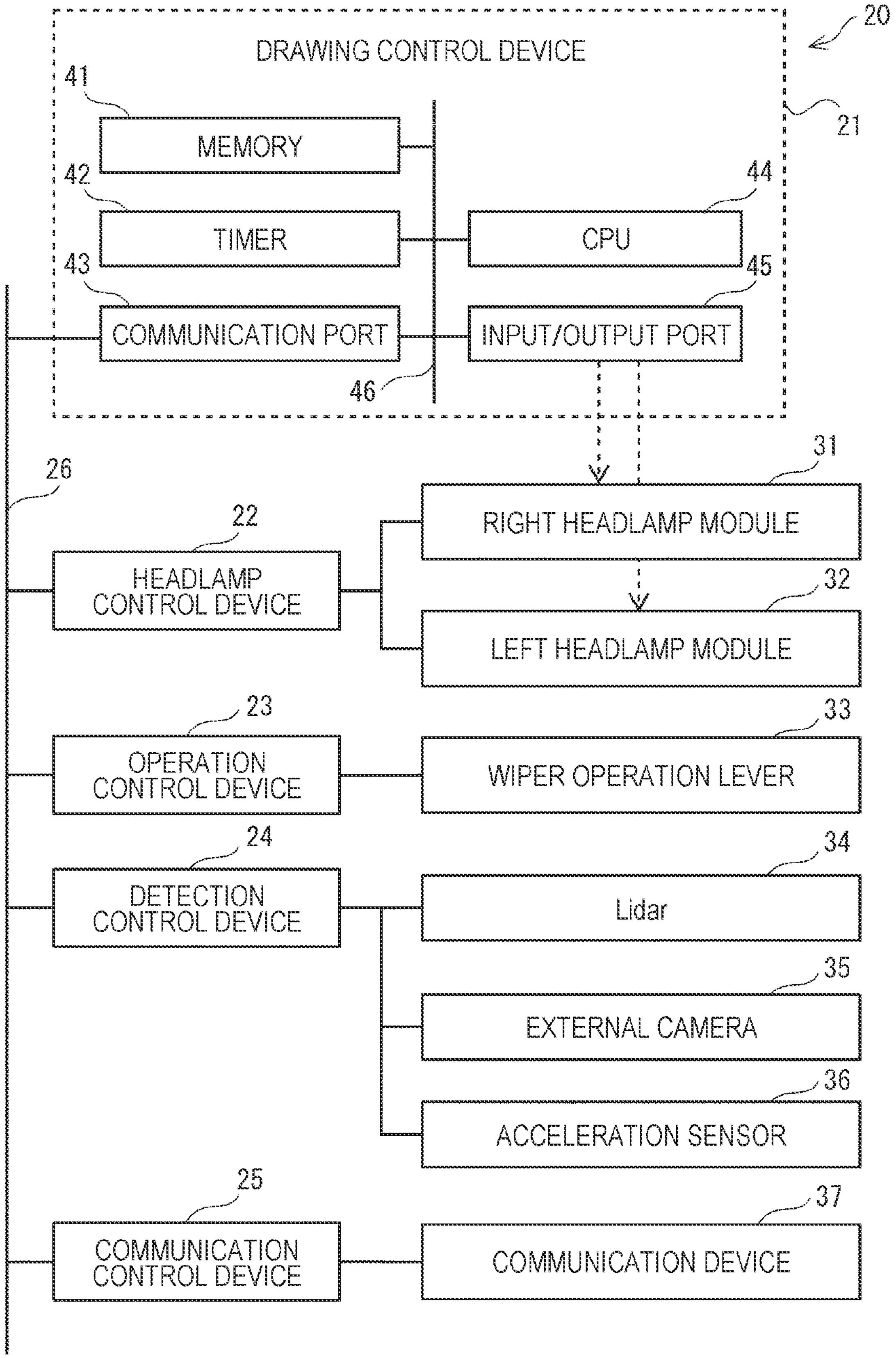
FIG. 4 illustrates a control system provided in the vehicle of FIG. 1.

FIG. 4 illustrates a control system 20 provided in the vehicle 1 of FIG. 1.

The control system 20 of the vehicle 1 of FIG. 4 includes control devices and a vehicle network 26 to which the control devices are coupled.

For example, the vehicle network 26 may be a wired communication network conforming to a controller area network (CAN) or a local interconnect network (LIN) for the vehicle 1. The vehicle network 26 may be a communication network such as a LAN or a combination of those networks. The vehicle network 26 may partly include a wireless communication network. The various devices coupled to the vehicle network 26 can exchange information via the vehicle network 26.

FIG. 4 illustrates a rendering control device 21, a headlamp control device 22, an operation control device 23, a detection control device 24, and a communication control device 25 as examples of the control devices. Other control devices such as a traveling control device and an air conditioning control device may be coupled to the vehicle network 26. Each control device illustrated in FIG. 4 may be coupled to the vehicle network 26 while being divided into multiple parts.

A right headlamp module 31 and a left headlamp module 32 provided at a front end 50 of the vehicle 1 are coupled to the headlamp control device 22. The right headlamp module 31 and the left headlamp module 32 are headlamp members that project light forward from the vehicle 1.

The right headlamp module 31 and the left headlamp module 32 of this embodiment include projection modules 53 for road surface rendering as described later. In one embodiment, the projection module 53 of the right headlamp module 31 and the projection module 53 of the left headlamp module 32 may serve as a projection member configured to project light for road surface rendering from the traveling vehicle 1 to render the road surface rendered image 11 on a road surface around the traveling vehicle 1. That is, the projection member may include a light source.

The headlamp control device 22 controls a lighting status of the right headlamp module 31 and a lighting status of the left headlamp module 32 based on information acquired via the vehicle network 26 about an operation on a lamp operation lever (not illustrated) and a detection value from an automatic light intensity sensor (not illustrated). With the lamp operation lever, an operation state such as "low beam", "high beam", or "OFF" can be set in general.

The headlamp control device 22 may output information on the lighting statuses of the right headlamp module 31 and the left headlamp module 32 to other control devices via the vehicle network 26.

Various operation members to be operated by an occupant such as the driver are coupled to the operation control device 23. FIG. 4 exemplifies a wiper operation lever 33 as the operation member. The wiper operation lever 33 is used for operating a wiper device (not illustrated) that wipes the outer surface of the windshield of the vehicle 1. With the wiper operation lever 33, an operation state such as "intermittent drive", "continuous drive", "high-speed continuous drive", or "OFF" can be set in general.

The operation control device 23 may output information on the operation states of the various operation members such as the wiper operation lever 33 to other control devices via the vehicle network 26.

Various detection members that detect the traveling condition and the traveling environment of the vehicle 1 are coupled to the detection control device 24. FIG. 4 exemplifies a lidar 34, an external camera 35, and an acceleration sensor 36 as the detection members.

The detection control device 24 may output, for example, detection information from the lidar 34 to other control devices via the vehicle network 26.

The lidar 34 is oriented forward at the front of the vehicle 1, and scans a forward area around the vehicle 1 with laser light.

The detection control device 24 may generate space information on the forward area around the vehicle 1 based on scanning information from the lidar 34. The space information based on the scanning information from the lidar 34 may include information on the shape of a road surface in the forward area around the vehicle 1. For example, when the vehicle 1 is traveling in the situation of FIG. 2 or FIG. 3, the space information based on the scanning information from the lidar 34 may include information indicating the rise in the road surface area 92 or 94 where the road surface rendered image 11 is rendered.

As illustrated in FIG. 1, the external camera 35 is oriented forward at an upper part of the cabin on the inner side of the windshield of the vehicle 1. The external camera 35 can capture an image of a forward view in the traveling direction of the vehicle 1 from substantially the same height position as that of the line of sight of the driver of the vehicle 1. The external camera 35 may be a 360-degree Camera or a stereo camera.

The image captured by the external camera 35 may include, as its detection image, the road surface rendered image 11 rendered by projecting light onto a road surface.

In one embodiment, the external camera 35, the lidar 34, or the like provided to the vehicle 1 may serve as a detection device configured to detect a road surface where the road surface rendered image 11 is projected. That is, the detection device may include a sensor.

The external camera 35 captures an image of a road surface where the projection modules 53 and 53 project light for the road surface rendering. In one embodiment, the lidar 34 may serve as a wave scanning member to detect the shape of the road surface by outputting laser light (wave) toward the road surface where the projection modules 53 and 53 project light for the road surface rendering.

The acceleration sensor 36 detects an acceleration of the traveling vehicle 1. The acceleration sensor 36 may detect three-axis accelerations.

Based on the three-axis accelerations from the acceleration sensor 36, the detection control device 24 may generate information such as roll, pitch, and yaw angular velocities and the moving speed and direction of the vehicle 1.

A communication device 37 is coupled to the communication control device 25. The communication device 37 exchanges information with a server device via a base station (not illustrated) or the like. Examples of the base station include a 5G base station and a base station for advanced driver assistance systems (ADAS) or intelligent transport systems (ITS). Some 5G base stations may have functions of a server device. The communication device 37 may directly communicate with other vehicles 1 or the like by vehicle-to-X (V2X) communication.

The communication control device 25 may transmit information acquired via the vehicle network 26 from the communication device 37 to a base station or a server device, or may output, to the vehicle network 26, information received by the communication device 37 from a base station or a server device.

The rendering control device 21 includes a memory 41, a timer 42, a communication port 43, an input/output port 45, a CPU 44, and an internal bus 46 to which those components are coupled. The control devices provided in the control system 20 basically have structures similar to that of the rendering control device 21.

The right headlamp module 31 and the left headlamp module 32 are coupled to the input/output port 45.

The communication port 43 is coupled to the vehicle network 26. The communication port 43 acquires information from the vehicle network 26, and outputs, to the vehicle network 26, information to be output by the rendering control device 21.

The timer 42 measures a period or time.

For example, the memory 41 may include a semiconductor memory, a hard disk drive (HDD), and a random access memory (RAM). The HDD is a non-volatile memory. The RAM is a volatile memory. The memory 41 records programs to be executed by the CPU 44 and various types of information to be used during execution of the programs as data. For example, the memory 41 records data on the projection patterns 60 illustrated in FIG. 1.

The CPU 44 reads and executes the programs recorded in the memory 41. Therefore, the CPU 44 serves as a controller of the rendering control device 21. In one embodiment, the CPU 44 may serve as a controller configured to control light projection for the road surface rendering by the projection modules 53 and 53.

The CPU 44 controls the operation of the rendering control device 21. The CPU 44 outputs signals to the right headlamp module 31 and the left headlamp module 32 via the communication port 43. In this way, the CPU 44 controls the projection modules 53 provided in the right headlamp module 31 and the left headlamp module 32 for the road surface rendering. The right headlamp module 31 and the left headlamp module 32 are lit in a projection pattern for the road surface rendering. For example, as illustrated in FIG. 1, the road surface rendered image 11 corresponding to the projection pattern may be rendered on the road surface.

In this way, the CPU 44 can control the light projection for the road surface rendering by the projection modules 53 and 53 based on the detection (captured image) by the external camera 35.

Figure 5:
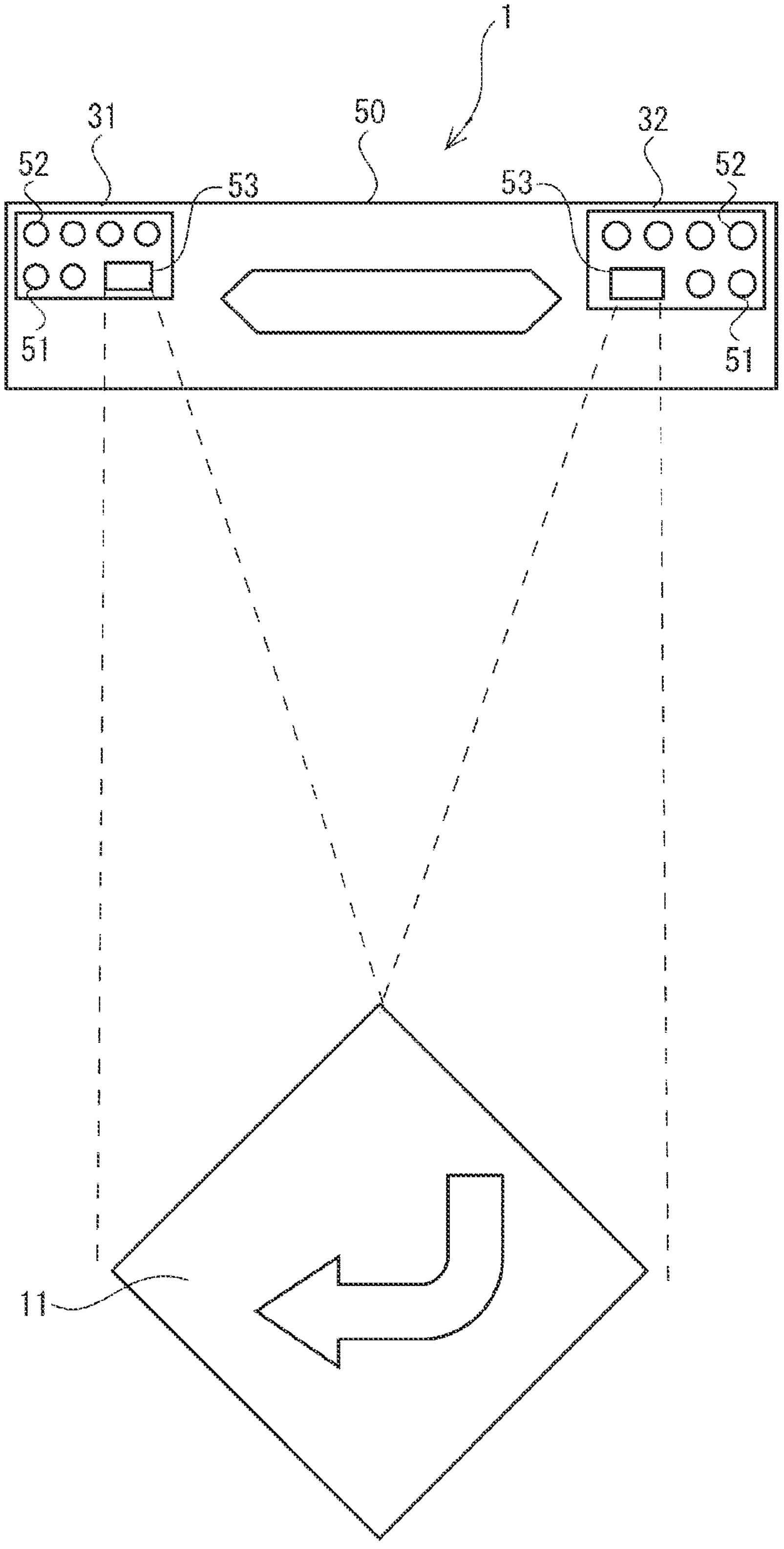
FIG. 5 schematically illustrates the structure and disposition of a right headlamp module and a left headlamp module at the front end of the vehicle of FIG. 1.

FIG. 5 schematically illustrates the structure and disposition of the right headlamp module 31 and the left headlamp module 32 at the front end 50 of the vehicle 1 of FIG. 1.

FIG. 5 illustrates the front end 50 of the vehicle 1.

The right headlamp module 31 is provided at the right end in the front end 50 of the vehicle 1. The right headlamp module 31 includes low-beam light emitting diodes (LEDs) 51, high-beam LEDs 52, and the micro electro mechanical systems (MEMS) projection module 53.

The left headlamp module 32 is provided at the left end in the front end 50 of the vehicle 1. The left headlamp module 32 includes low-beam LEDs 51, high-beam LEDs 52, and the MEMS projection module 53.

For example, the projection module 53 may be a digital micromirror device (DMD).

In one embodiment, the MEMS projection module 53 may serve as the projection member, and projects light by reflecting light from a three-color light source by MEMS elements. The reflection state of each MEMS element may be controlled based on an image signal.

The right headlamp module 31 or the left headlamp module 32 may use a device that can render an image on a road surface, except for the MEMS projection module 53.

The MEMS projection module 53 may project light inside and outside the radiation range of the low-beam LEDs 51 and the high-beam LEDs 52 as a whole. A part of the no-crossing rendering pattern for a pedestrian in FIG. 1 is outside the radiation range of the low-beam LEDs 51 and the high-beam LEDs 52 as a whole.

In FIG. 5, the MEMS projection modules 53 of the right headlamp module 31 and the left headlamp module 32 project light in cooperation to render a right turn road surface rendered image 11 corresponding to the right turn projection pattern 65 on a road surface. The road surface rendered image 11 can be rendered at any position and in any size within a range in which the two projection modules 53 and 53 can project light.

In FIG. 5, the MEMS projection module 53 of the right headlamp module 31 and the MEMS projection module 53 of the left headlamp module 32 may individually render road surface rendered images 11 on the road surface.

The CPU 44 controls the MEMS projection module 53 of the right headlamp module 31 and the MEMS projection module 53 of the left headlamp module 32 based on the projection pattern to render the road surface rendered image 11 corresponding to the projection pattern on the road surface. In one embodiment, the MEMS projection module 53 of the right headlamp module 31 and the MEMS projection module 53 of the left headlamp module 32 may serve as the projection member configured to project the light for the road surface rendering at least toward a road surface ahead of the vehicle 1 based on the projection pattern.

Figure 6:
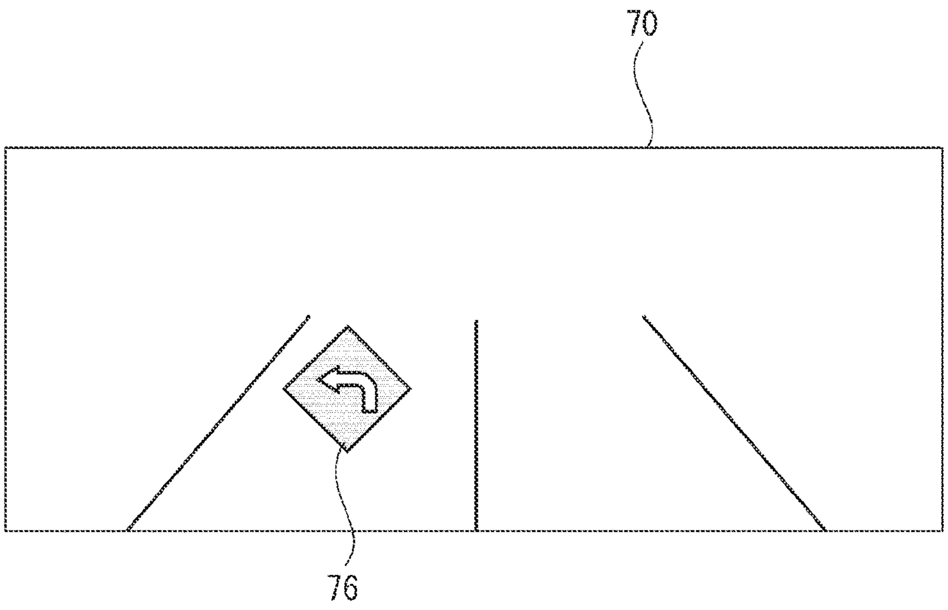
FIG. 6 illustrates an image captured by an external camera under the traveling condition of FIG. 1.

FIG. 6 illustrates an image 70 captured by the external camera 35 under the traveling condition of FIG. 1.

The image 70 of FIG. 6 is captured by the external camera 35 of the traveling vehicle 1 of FIG. 1. In FIG. 6, the CPU 44 causes the projection modules 53 and 53 to project light to render the road surface rendered image 11 on the road surface.

Therefore, the captured image 70 of FIG. 6 includes the road where the vehicle 1 is traveling, and a detection image 76 corresponding to the road surface rendered image 11 rendered on the road surface.

The image 70 captured by the external camera 35 may be an image showing the forward road surface in the traveling direction of the vehicle 1 from substantially the same height position as that of the line of sight of the driver of the vehicle 1.

Figure 7:
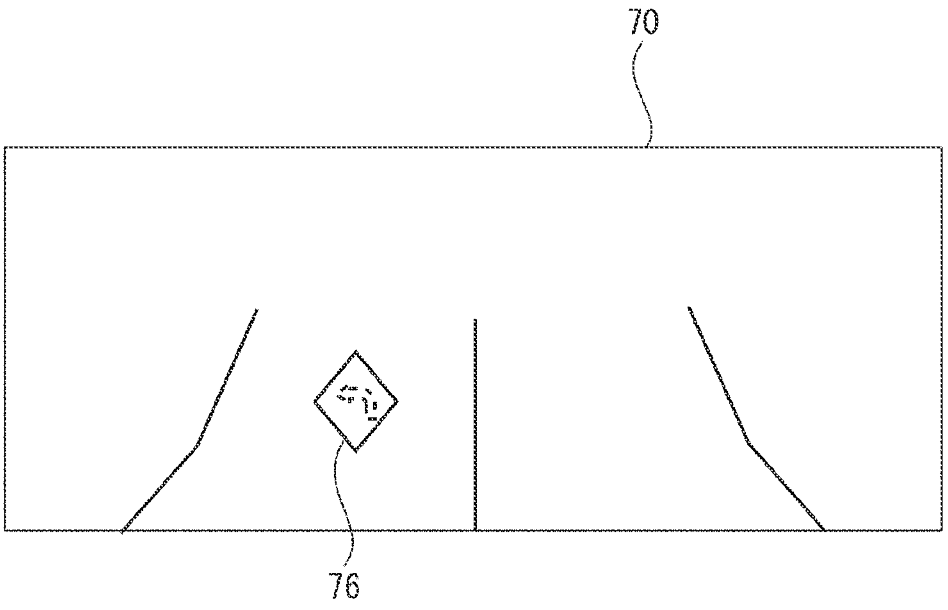
FIG. 7 illustrates an image captured by the external camera under the traveling condition of FIG. 3 or FIG. 6.

FIG. 7 illustrates an image 70 captured by the external camera 35 under the traveling condition of FIG. 2 or FIG. 3.

The image 70 of FIG. 7 is captured by the external camera 35 of the vehicle 1 under the traveling condition of FIG. 2 or FIG. 3. In FIG. 7, the CPU 44 causes the projection modules 53 and 53 to project light to render the road surface rendered image 11 on the road surface.

Therefore, the captured image 70 of FIG. 7 includes the road where the vehicle 1 is traveling, and a detection image 76 corresponding to the road surface rendered image 11 rendered on the road surface.

The image 70 captured by the external camera 35 may be an image showing the forward road surface in the traveling direction of the vehicle 1 from substantially the same height position as that of the line of sight of the driver of the vehicle 1.

The detection image 76 corresponding to the road surface rendered image 11 of FIG. 6 clearly shows a left-turn arrow rendered in the road surface rendered image 11. The driver of the vehicle 1 is expected to easily recognize the left-turn arrow in the road surface rendered image 11 at a glance.

In the detection image 76 corresponding to the road surface rendered image 11 of FIG. 7, the road surface rendered image 11 is rendered on the road surface area 92 or 94 rising relative to the road surface 91 or 93 where the vehicle 1 is traveling. Therefore, the entire road surface rendered image 11 is bright and the left-turn arrow rendered in the road surface rendered image 11 is faint. The driver of the vehicle 1 is expected to have difficulty in recognizing what is indicated by the rendering by giving a glance at the left-turn arrow in the road surface rendered image 11.

Figure 8:
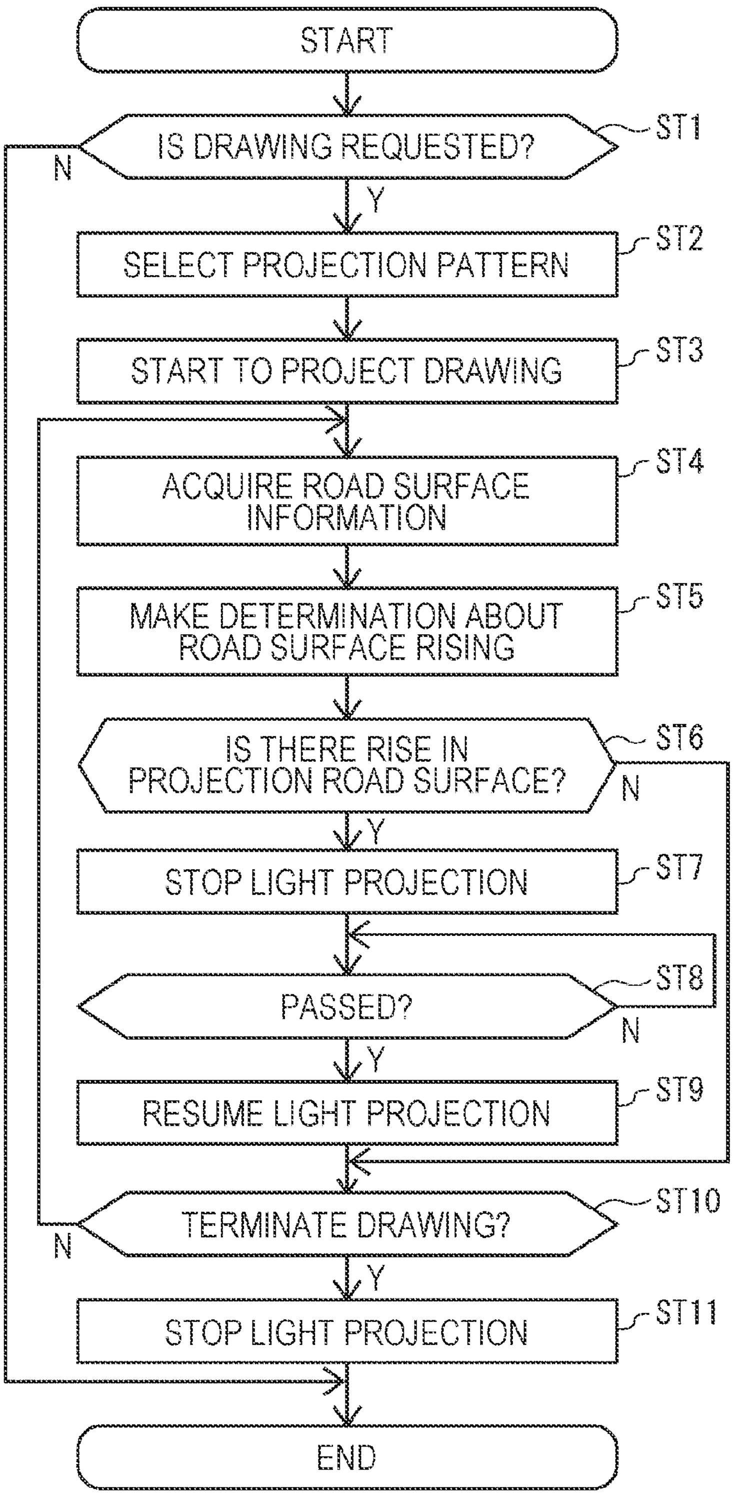
FIG. 8 is a flowchart of road surface rendering control to be executed by a rendering control device of FIG. 4.

FIG. 8 is a flowchart of road surface rendering control to be executed by the rendering control device 21 of FIG. 4.

The CPU 44 of the rendering control device 21 repeats the road surface rendering control of FIG. 8.

In one embodiment, if the headlamp control device 22 has a rendering control function in the control system 20, a CPU of the headlamp control device 22 may serve as the controller to repeat the road surface rendering control of FIG. 8.

In Step ST1, the CPU 44 that controls light projection for road surface rendering determines whether the road surface rendering is requested. The request for the road surface rendering may be generated by various control devices of the control system 20. For example, when lighting the headlamps, the headlamp control device 22 may generate information for requesting the road surface rendering and output the information to the rendering control device 21 via the vehicle network 26. When the road surface rendering is requested, the CPU 44 advances the process to Step ST2. When the road surface rendering is not requested, the CPU 44 terminates this control.

In Step ST2, the CPU 44 selects a projection pattern to be used for the road surface rendering from among the projection patterns 60 recorded in the memory 41. The CPU 44 may select multiple projection patterns.

In Step ST3, the CPU 44 starts to project light for the road surface rendering. The CPU 44 controls the projection module 53 of the right headlamp module 31 and the projection module 53 of the left headlamp module 32 to irradiate a road surface with light in the projection pattern selected in Step ST2. Thus, a road surface rendered image 11 corresponding to the projection pattern is rendered on the road surface.

In Step ST4, the CPU 44 acquires the latest captured image 70 from the external camera 35. The CPU 44 may acquire space information based on scanning information from the lidar 34.

In Step ST5, the CPU 44 analyzes, for example, the captured image 70 acquired in Step ST4, and determines whether the road surface area where the road surface rendered image 11 is rendered rises relative to the road surface area where the vehicle is traveling.

In FIG. 6, the road surface rendered image 11 is rendered on the road surface in FIG. 1. Therefore, the road surface area where the road surface rendered image 11 is rendered does not rise relative to the road surface area where the vehicle 1 is traveling.

In FIG. 7, the road surface area 92 or 94 where the road surface rendered image 11 is rendered rises relative to the road surface area 91 or 93 where the vehicle 1 is traveling.

The CPU 44 analyzes, for example, the captured image 70 acquired in Step ST4, and determines whether the road surface area rises.

For example, when the capturing position of the detection image 76 corresponding to the road surface rendered image 11 in the image 70 captured by the external camera 35 is lower than the capturing position in the previous captured image 70 by a threshold or more, the CPU 44 may determine that the road surface area for the road surface rendering rises relative to the road surface area where the vehicle 1 is traveling. The CPU 44 may otherwise determine that the road surface area for the road surface rendering does not rise relative to the road surface area where the vehicle 1 is traveling.

As indicated by the broken line from the external camera 35 to the road surface rendered image 11 in FIG. 2 or FIG. 3, the actual road surface rendered image captured by the external camera 35 descends in its angle of view when the road surface area 92 or 94 where the road surface rendered image 11 is rendered rises.

At this time, the CPU 44 may superimpose the captured images 70 before and after comparison, and determine whether the capturing position at the upper end of the detection image 76 in the captured image 70 after comparison descends by a predetermined threshold number of pixels or more.

When the vehicle travels along a rough road surface, the body moves up and down compared with a case where the vehicle travels along a flat road surface.

The behavior of the body of the vehicle changes by traveling control.

The threshold is used for reducing the occurrence of a case where the variation in the capturing position of the detection image 76 due to such normal effects is determined as road surface rising.

When the road surface area for the road surface rendering rises, for example, greatly relative to the road surface area where the vehicle 1 is traveling though the threshold is used, determination can be made that the road surface rises. When the road surface area for the road surface rendering rises greatly relative to the road surface area where the vehicle 1 is traveling and the light of the road surface rendered image 11 toward the driver of the vehicle 1 is intense, determination can be made that the road surface rises.

In Step ST6, the CPU 44 determines whether determination has been made in Step ST5 that the road surface area for the road surface rendering rises relative to the road surface area where the vehicle 1 is traveling. When determination is made that there is a rise, the CPU 44 advances the process to Step ST7. When determination is not made that there is a rise, the CPU 44 advances the process to Step ST10.

In Step ST7, the CPU 44 stops projecting the light for the road surface rendering. The CPU 44 controls the projection module 53 of the right headlamp module 31 and the projection module 53 of the left headlamp module 32 to stop projecting the light toward the road surface.

In Step ST8, the CPU 44 makes determination on the timing to resume the light projection. The CPU 44 determines whether the vehicle 1 has passed through the road surface area determined as rising.

At this time, the CPU 44 may acquire a new image 70 captured by the external camera 35, and determine whether the vehicle 1 has passed through the road surface area determined as rising based on the captured image 70.

The CPU 44 may cause the timer 42 to measure a period that has elapsed after the stop of the light projection, and make determination on the timing to resume the light projection based on whether the period measured by the timer 42 has exceeded a threshold.

The CPU 44 may calculate the threshold of the period measured by the timer 42 based on a current vehicle speed and the separation distance D1.

When determination is not made that the vehicle 1 has passed through the road surface area determined as rising, the CPU 44 repeats this step. In this period, the light projection for the road surface rendering remains stopped.

When determination is made that the vehicle 1 has passed through the road surface area determined as rising, the CPU 44 advances the process to Step ST9.

In Step ST9, the CPU 44 resumes the light projection for the road surface rendering by the projection modules 53 after the vehicle 1 has passed through the road surface area determined as rising.

After the CPU 44 has determined that the road surface area for the road surface rendering rises relative to the road surface area where the vehicle 1 is traveling and has stopped the light projection for the road surface rendering by the projection modules 53, the CPU 44 can continue to stop the light projection for the road surface rendering by the projection modules 53 until the vehicle 1 passes through the road surface area determined as rising. Then, the CPU 44 can resume the light projection for the road surface rendering by the projection modules 53.

In Step ST10, the CPU 44 determines whether to terminate the rendering. The CPU 44 may determine to terminate the road surface rendering, for example, when the road surface rendering is not requested. In this case, the CPU 44 advances the process to Step ST11.

For example, when the road surface rendering is still requested, the CPU 44 determines not to terminate the road surface rendering, and returns the process to Step ST4. In this case, the CPU 44 repeats the process from Step ST4 to Step ST10 to continue the control for the road surface rendering.

In Step ST11, the CPU 44 stops projecting the light for the road surface rendering. The CPU 44 controls the projection module 53 of the right headlamp module 31 and the projection module 53 of the left headlamp module 32 to stop projecting the light toward the road surface. Then, the CPU 44 terminates this control.

In this way, the CPU 44 can determine whether the road surface area for the road surface rendering rises relative to the road surface area where the vehicle 1 is traveling based on the detection of the road surface by the external camera 35. When the road surface area for the road surface rendering rises relative to the road surface area where the vehicle 1 is traveling, the CPU 44 can perform control to suppress the light projection for the road surface rendering by the projection modules 53.

As described above, the vehicle 1 according to this embodiment includes the external camera 35 configured to detect the road surface where the projection modules 53 project the light for the road surface rendering. The CPU 44 configured to control the light projection for the road surface rendering by the projection modules 53 determines whether the road surface area for the road surface rendering rises relative to the road surface area where the vehicle 1 is traveling based on the detection of the road surface by the external camera 35. When the road surface area for the road surface rendering rises relative to the road surface area where the vehicle 1 is traveling, the CPU 44 suppresses the light projection for the road surface rendering by the projection modules 53.

When the road surface area for the road surface rendering rises relative to the road surface area where the vehicle 1 is traveling and intense light may be reflected toward the driver of the vehicle 1, the light projection for the road surface rendering by the projection modules 53 can be suppressed.

In this embodiment, when the traveling vehicle 1 approaches, for example, an uphill as illustrated in FIG. 2, it is possible to reduce the occurrence of a case where light that is more intense than expected is reflected toward the driver of the vehicle 1 due to the light projection for the road surface rendering. In this embodiment, the road surface rendering from the vehicle 1 can be improved.

The embodiment described above is an exemplary embodiment of the disclosure but is not limitative, and various modifications or alterations may be made without departing from the scope disclosed herein.

In the embodiments described above, the projection module 53 is provided in the vehicle 1 while being integrated with the headlamp LEDs 51 and 52 in the right headlamp module 31 or the left headlamp module 32.

For example, the projection module 53 may be provided in the vehicle 1 separately from the right headlamp module 31 or the left headlamp module 32.

The vehicle 1 may include one, three, or more projection modules 53. The one projection module 53 or the third projection module 53 may be provided at the center of the front part of the vehicle in a width direction.

The vehicle according to the embodiment of the disclosure includes the detection device configured to detect the road surface where the projection member projects the light for the road surface rendering. The controller configured to control the light projection for the road surface rendering by the projection member determines whether the road surface area for the road surface rendering rises relative to the vehicle based on the detection of the road surface by the detection device. When the road surface area for the road surface rendering rises relative to the road surface area where the vehicle is traveling, the controller suppresses the light projection for the road surface rendering by the projection member.

When the road surface area for the road surface rendering rises relative to the road surface area where the vehicle is traveling, the light projection for the road surface rendering by the projection member can be suppressed.

In the embodiment of the disclosure, when the traveling vehicle approaches, for example, an uphill, it is possible to reduce the occurrence of a case where light that is more intense than expected is reflected toward the driver of the vehicle due to the light projection for the road surface rendering. In the embodiment of the disclosure, the road surface rendering from the vehicle can be improved.

The rendering control device 21 illustrated in FIG. 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the rendering control device 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 4.

The invention claimed is:

1. A vehicle with a road surface rendering function, the vehicle comprising:
- a projection member configured to project a projection pattern that is one of predefined images onto a road surface ahead of the vehicle, the projection member being distinct from and independently controllable relative to low-beam and high-beam light sources;
- a detection device comprising an external camera fixed to the vehicle and configured to capture images of a forward road surface that includes the projection pattern; and
- a controller configured to:
  - determine, based on the captured images, whether a first road surface area ahead of the vehicle rises relative to a second road surface area on which the vehicle is currently traveling, the determining including detecting, in successive captured images, that a position of the projection pattern itself shifts toward a lower portion of a field of view by at least a threshold;
  - stop projecting the projection pattern by the projection member, based only on determining that the first road surface area rises relative to the second road surface area; and
  - resume, without requiring driver input and upon determining that the vehicle has passed through the first road surface area determined as rising, projection of the projection pattern onto the road surface ahead of the vehicle.

2. The vehicle with the road surface rendering function according to claim 1, wherein the detection device further comprises
- a wave scanning member configured to detect shapes of the first road surface area by outputting a wave toward the road surface.

3. A vehicle with a road surface rendering function, the vehicle comprising:
- a projection member configured to project a projection pattern that is one of predefined images onto a road surface ahead of the vehicle, the projection member being distinct from and independently controllable relative to low-beam and high-beam light sources;
- a detection device comprising an external camera fixed to the vehicle and configured to capture images of a forward road surface that includes the projection pattern; and
- circuitry configured to:
  - determine, based on the captured images, whether a first road surface area ahead of the vehicle rises relative to a second road surface area on which the vehicle is currently traveling, the determining including detecting, in successive captured images, that a position of the projection pattern itself shifts toward a lower portion of a field of view by at least a threshold;

stop projecting the projection pattern by the projection member, based only on determining that the first road surface area rises relative to the second road surface area; and resume, without requiring driver input and upon determining that the vehicle has passed through the first road surface area determined as rising, projection of the projection pattern onto the road surface ahead of the vehicle.

4. The vehicle with the road surface rendering function according to claim 1, wherein the controller is configured to determine that the first road surface area rises relative to the second road surface area based on determining that a capturing position of an upper end of the detection image corresponding to the projection pattern descends, between successive captured images, by a predetermined threshold number of pixels.

5. The vehicle with the road surface rendering function according to claim 1, wherein, after the controller has determined that the first road surface area rises relative to the second road surface area and has stopped projecting the projection pattern, the controller keeps the projection stopped until the vehicle passes through the first road surface area determined as rising, and resumes projecting the projection pattern after the vehicle has passed through the first road surface area, wherein determining that the vehicle has passed through the first road surface area is based on either (i) a captured image from the external camera indicating passage or (ii) expiration of a period measured by a timer calculated from a current vehicle speed and a separation distance, the separation distance being a preset distance from the vehicle to a nominal rendering location of the projection pattern on the road surface ahead of the vehicle.

* * * * *